United States Patent
Kawamoto et al.

(10) Patent No.: US 8,144,822 B2
(45) Date of Patent: Mar. 27, 2012

(54) NOISE POWER ESTIMATION APPARATUS, NOISE POWER ESTIMATION METHOD AND SIGNAL DETECTION APPARATUS

(75) Inventors: Junichiro Kawamoto, Yokohama (JP); Noriyuki Maeda, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 963 days.

(21) Appl. No.: 12/117,384

(22) Filed: May 8, 2008

(65) Prior Publication Data
US 2008/0253432 A1 Oct. 16, 2008

Related U.S. Application Data

(62) Division of application No. 11/128,188, filed on May 13, 2005, now Pat. No. 7,421,009.

(30) Foreign Application Priority Data

May 13, 2004 (JP) ................... 2004-144181

(51) Int. Cl.
*H03D 1/04* (2006.01)

(52) U.S. Cl. ........ 375/346; 375/144; 375/148; 375/316; 375/340; 375/342; 375/348; 375/349

(58) Field of Classification Search ........... 375/144, 375/148, 316, 340, 342, 346, 348, 349; 455/63.1, 455/142.2
See application file for complete search history.

(56) References Cited

U.S. PATENT DOCUMENTS

| 6,034,952 | A | * | 3/2000 | Dohi et al. | 370/335 |
| 6,377,607 | B1 | * | 4/2002 | Ling et al. | 375/130 |
| 6,975,669 | B2 | * | 12/2005 | Ling et al. | 375/141 |
| 7,027,496 | B2 | * | 4/2006 | Tapaninen | 375/227 |
| 7,283,510 | B2 | * | 10/2007 | Ito et al. | 370/346 |
| 2002/0191535 | A1 | | 12/2002 | Sugiyama et al. | |
| 2004/0076224 | A1 | | 4/2004 | Onggosanusi et al. | |

FOREIGN PATENT DOCUMENTS

| EP | 1 176 730 A1 | 1/2002 |
| EP | 1 337 054 A2 | 8/2003 |
| JP | 2003-124907 | 4/2003 |

* cited by examiner

*Primary Examiner* — Chieh M Fan
*Assistant Examiner* — Sophia Vlahos
(74) *Attorney, Agent, or Firm* — Oblon, Spivak, McClelland, Maier & Neustadt, L.L.P.

(57) ABSTRACT

A noise power estimation apparatus is disclosed. The noise power estimation apparatus includes: a part for calculating correlation between a received signal and a pilot signal so as to obtain a received power of the pilot signal for each path; a part for removing a multipath interference component from the received power of the pilot signal by using a predetermined power ratio between the pilot signal and a data signal so as to obtain a corrected received power of the pilot signal; a part for estimating an estimated total power of the pilot signal and the data signal included in the received signal based on the corrected received power and the predetermined power ratio; and a part for subtracting the estimated total power from a total power of the received signal so as to obtain a noise power.

3 Claims, 8 Drawing Sheets

ND SIGNAL DETECTION APPARATUS

CROSS-REFERENCES TO RELATED APPLICATION

This application is a divisional of and is based upon and claims the benefit of priority under 35 U.S.C. §120 for U.S. Ser. No. 11/128,188, filed May 13, 2005, and claims the benefit of priority under 35 U.S.C. §119 from Japanese Patent Application No. 2004-144181, filed May 13, 2004, the entire contents of each which are incorporated herein by reference.

BACKGROUND OF THE INVENTION

1. Field of the Invention

The present invention relates to a field of radio communications. More particularly, the present invention relates to a signal detection apparatus used in a radio receiver, and an apparatus and a method for estimating a noise power used for signal detection.

2. Description of the Related Art

In the field of the radio communications, research and development are being conducted for realizing large-capacity high-speed information communications of current and the next generation or later. Especially, the Multi Input Multi Output (MIMO) scheme for increasing the communication capacity is receiving attention.

FIG. 1 is a schematic diagram of a communication system of the MIMO scheme including a transmitter 102 and a receiver 104. In the MIMO scheme, different signals are transmitted from plural transmission antennas 106-1~N at the same time with the same frequency. These transmission signals are received by plural receiving antennas 108-1~N. For the sake of simplicity, each number of the transmission antennas and the receiving antennas is N, but the numbers may be different between the transmitter and the receiver.

FIG. 2 shows a part relating to signal separation in the receiver 104. Roughly speaking, the receiver receives signals transmitted from the plural transmission antennas with the plural receiving antennas, a signal detection part detects the transmission signals, and the transmission signals are separated to signals for each transmission antenna. The signal separation is performed by signal processing in the two-dimensional frequency domain by using the Minimum Mean Square Error (MMSE) method. Received signals (r) received by each receiving antenna are supplied to a channel estimation part 202. The channel estimation part 202 obtains channel impulse responses or channel estimation values between the transmission antennas and the receiving antennas. The channel estimation result is supplied to a fast Fourier transform part (FFT) 204 to be converted to information in the frequency domain and supplied to a weight generation part 206. A weight W generated in the weight generation part 206 is represented by a following equation, for example:

$$W = (HH^H + \sigma^2 I)^{-1} H \quad (1)$$

wherein, "H" indicates a channel matrix having channel impulse responses as its matrix elements, "I" indicates a unit matrix, and a $\sigma^2$ indicates a noise power arising in the receiver. The superscript "H" indicates transposed conjugate.

The received signals (r) are also supplied to a fast Fourier transform part 210, and are converted to signals in the frequency domain so that the signals are supplied to a MMSE equalizing part 208. The MMSE equalizing part 208 substantially performs signal separation by multiplying the received signals in the frequency domain by a weight $W^H$. The separated signals are supplied to an inverse fast Fourier transform part 212 so that the signals are converted to signals in the time domain, and the signals are output as estimated signals t that are separated for each transmission antenna.

Japanese Laid-Open Patent Application No. 2003-124907 discloses using a signal-to-noise ratio in the MIMO scheme.

For correctly estimating the transmission signals, it is necessary to perform signal separation with very high precision in the signal detection part. For this purpose, it is necessary to correctly obtain the weight W. As shown in the equation (1), since the weight W is largely affected by the channel matrix, the channel estimation needs to be performed correctly in the channel estimation part 202. In addition, according to the equation (1), the weight W is affected by the noise power $\sigma$, the noise power needs to be obtained correctly. However, according to the conventional technology of this field, little attempt had been made to obtain the noise power correctly. However, in future products for high-capacity and high-speed information transmission, there is a risk in that signal separation is not properly performed due to lack of estimation accuracy of the noise power.

SUMMARY OF THE INVENTION

The present invention is contrived to solve at least one of the above-mentioned problems. An object of the present invention is to provide a noise power estimation apparatus, a noise power estimation method and a signal detection apparatus for estimating a chip noise power used for weight calculation in the MMSE equalizer with high precision.

The object is achieved by a noise power estimation apparatus, including:
  a part for calculating correlation between a received signal and a pilot signal so as to obtain a received power of the pilot signal for each path;
  a part for removing a multipath interference component from the received power of the pilot signal by using a predetermined power ratio between the pilot signal and a data signal so as to obtain a corrected received power of the pilot signal;
  a part for estimating an estimated total power of the pilot signal and the data signal included in the received signal based on the corrected received power and the predetermined power ratio; and
  a part for subtracting the estimated total power from a total power of the received signal so as to obtain a noise power.

According to the present invention, the noise power used for weight calculation in the MMSE equalizer and the like can be estimated with high precision.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

(Outline of the Embodiments)

According to an embodiment of the present invention, the noise power is estimated such that the effect of the multipath interference is removed. Thus, the noise power can be estimated more correctly compared with the conventional technology. Therefore, the weight used for signal separation can be obtained correctly, so that the accuracy of the signal separation can be improved.

According to an embodiment of the present invention, the noise power can be recursively updated by using a recurrence formula including an oblivion coefficient. Thus, the noise power can be adaptively updated according to a communication environment, so that the calculation accuracy of the weights and the signal separation accuracy can be further improved.

According to an embodiment of the present invention, the multipath interference component can be obtained by accumulating, for plural paths and for plural transmission antennas, a product of the received power of the pilot signal and a constant including the predetermined power ratio. Thus, the multipath interference component can be obtained easily and with reliability.

First Embodiment

Figure 1:
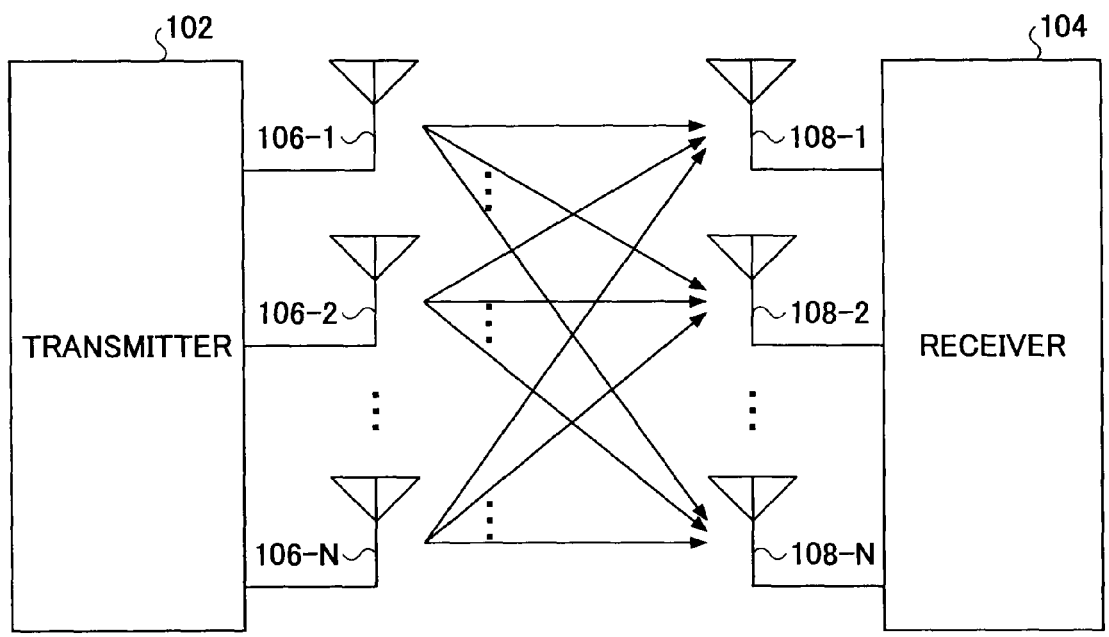
FIG. 1 is a schematic diagram of a communication system of the MIMO scheme.
Figure 2:
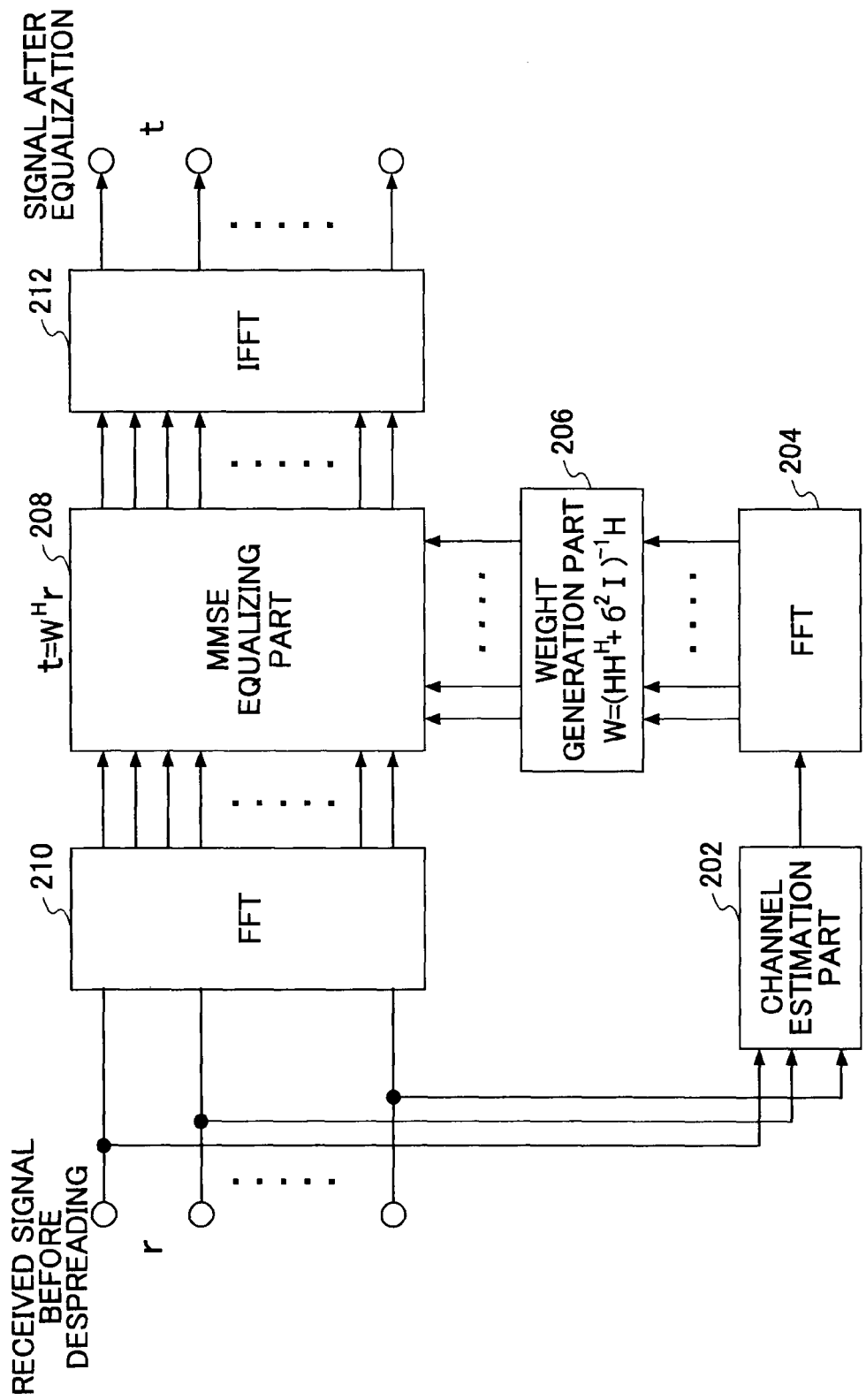
FIG. 2 shows a conventional MMSE equalization apparatus of the two-dimensional frequency domain.
Figure 3:
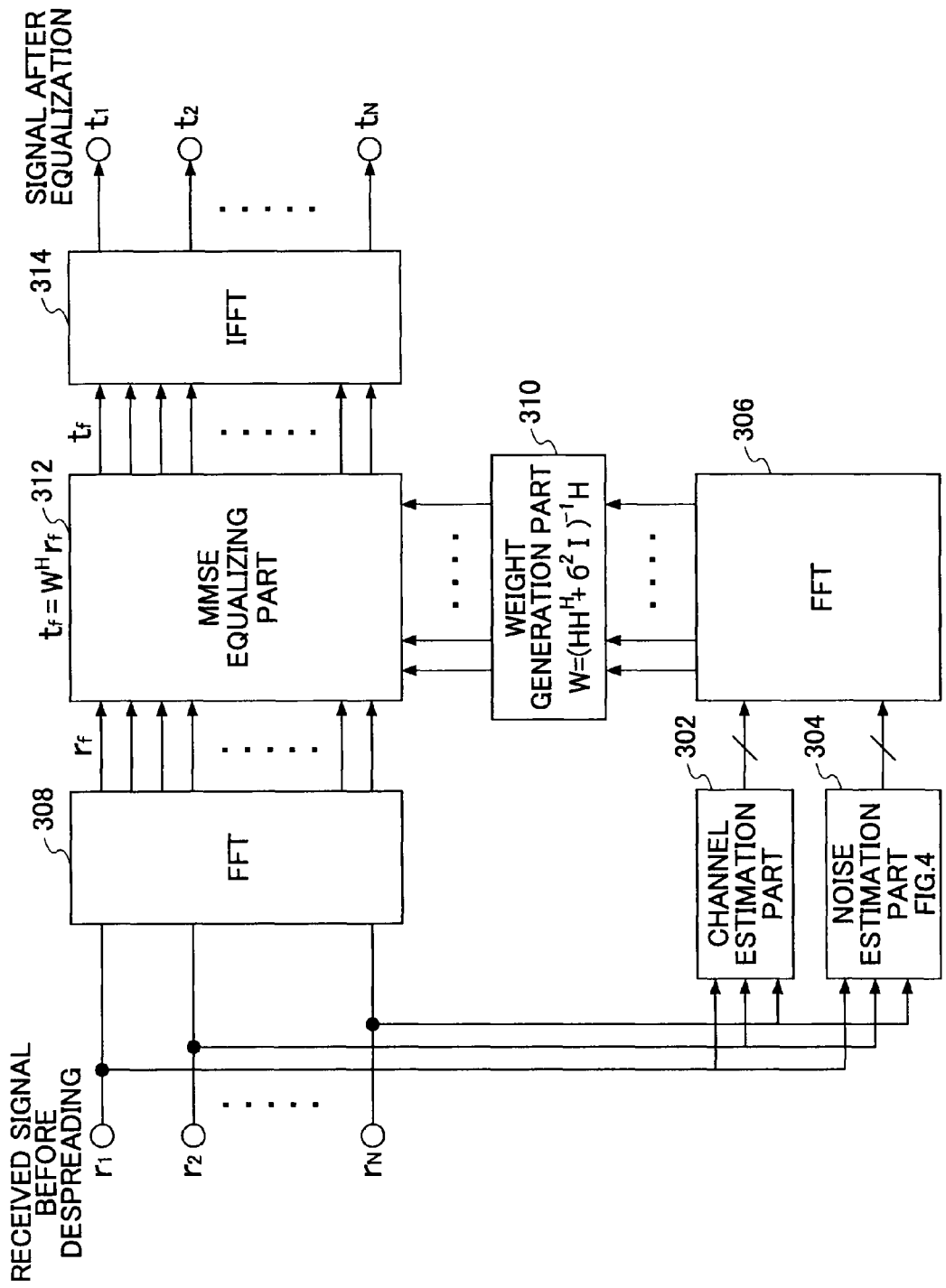
FIG. 3 shows a MMSE equalization apparatus of the two-dimensional frequency domain according to an embodiment of the present invention.

FIG. 3 shows a part relating to a signal detection apparatus in the receiver 104. In outline, the receiver receives signals transmitted from N transmission antennas with N receiving antennas, detects transmission signals, and separates signals for each transmission antenna. The signal separation is performed by signal processing in the two-dimensional frequency domain by using the MMSE (Minimum Mean Square Error) method. Instead of using the frequency domain, equalization by MMSE can be also performed in the time domain. But, in view of simplicity of calculation, it is desirable to perform signal processing in the frequency domain like the present embodiment. Although both of the numbers of the transmission antennas and the receiving antennas are N in this embodiment, the numbers may be different.

The receiver includes a channel estimation part 302, a noise estimation part 304, fast Fourier transform parts (FFT) 306 and 308, a weight generation part 310, a MMSE equalizing part 312 and an inverse fast Fourier transform part (IFFT) 314.

The channel estimation part 302 receives received signals $r=(r_1, \ldots, r_N)$ that are received by each corresponding receiving antenna. The channel estimation part 302 calculates channel impulse responses (CIR) or channel estimated values between the transmission antennas and the receiving antennas based on the received signals and pilot signals.

The noise estimation part 304 estimates a noise power or a chip noise power $\sigma^2$ based on the received signals. More detailed configurations and operations of the noise estimation part 304 are described later.

Each of the fast Fourier transform parts 306 and 308 performs fast Fourier transform on input signals so as to transform the signals to signals in the frequency domain. On the other hand, the inverse fast Fourier transform part 314 performs inverse fast Fourier transform on input signals so as to transform the input signals to the signals in the time domain.

The weight generation part 310 obtains the weight W used in the MMSE equalizing part 312 based on the channel estimation result and the noise power. The weight W is represented by a following equation;

$$W=(HH^H+\sigma^2 I)^{-1}H \quad (2)$$

wherein "H" indicates a channel matrix having the channel impulse responses as matrix elements, superscript "H" indicates a transposed conjugate, "I" indicates a unit matrix, and $\sigma^2$ indicates a noise power occurring in the receiver. The noise power ideally includes only a noise arisen in the receiver and does not include a noise applied in the outside of the receiver (for example, signal interference applied in a propagation route). However, the noise power includes the noise in the outside of the receiver in actuality. Therefore, the noise power needs to be precisely estimated in the following way. In the present embodiment, since the number of the antennas is N for both of the receiving side and the transmission side, each of the channel matrix H and the weight matrix becomes a N×N square matrix. When the channel matrix is a M×N matrix, $HH^H$ becomes a M×M square matrix, and the weight matrix W becomes a M×N matrix. In this case, N represents the number of the transmission antennas, and M indicates the number of receiving antennas.

The MMSE equalizing part 312 multiplies the converted frequency domain signals by the weight $W^H$ so as to perform signal separation ($t_f=W^H r_f$), wherein $r_f$ indicates signals obtained by converting the received signals r to the frequency domain, and $t_f$ indicates separated signals in the frequency domain. The separated signals are supplied to the inverse fast Fourier transform part 314 so that the signals are transformed to signals in the time domain to be output as estimated transmission signals $t=(t_1, \ldots, t_N)$ that are separated for each transmission antenna.

Figure 4:
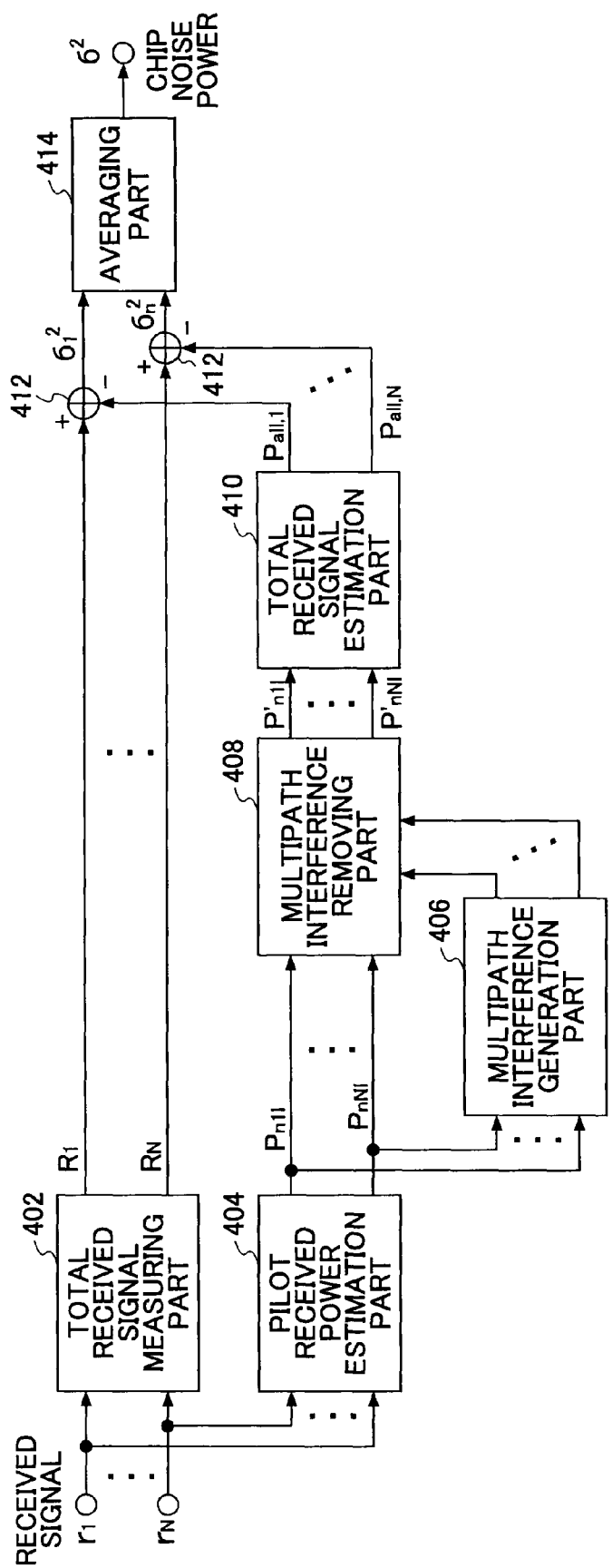
FIG. 4 is a block diagram of a noise estimation part according to an embodiment of the present invention.

FIG. 4 is a block diagram of the noise estimation part 304 according to an embodiment of the present invention. The noise estimation part 304 includes a total received signal power measuring part 402, a pilot received power estimation part 404, a multipath interference generation part 406, a multipath interference removing part 408, a total received signal power estimation part 410, a subtraction part 412 and an averaging part 414.

The total received signal power measuring part 402 measures a total received power $R_m$ of signals received by a receiving antenna $r_m$ as shown in the following equation:

$$R_m=E(|r_m(t)|^2)$$

wherein $E(\cdot)$ indicates a process for calculating an average or an expected value of an amount in the parentheses, and m is a parameter for specifying a receiving antenna ($1 \leq m \leq M$). In this embodiment, the number M of the receiving antennas is the same as the number N of the transmission antennas. The total received signal power measuring part 402 obtains a total received power for each receiving antenna.

The pilot received power estimation part 404 calculates a received power $P_{n,m,l}$ of a pilot signal for each path by the following equation:

$$p_{n,m,l} = \left| \frac{1}{N_c} \sum_{t=\tau_l}^{N_c-1+\tau_l} r_m(t) \cdot c_n^*(t - \tau_l) \right|^2$$

wherein n is a parameter indicating a transmission antenna, l is a parameter that specifies a path in assumed L paths, $\tau_l$ indicates a delay amount of a l-th path, * indicates complex conjugate, Nc indicates the number of chips in one frame and specifies the number of chips or a size of a window of a range in which correlation calculation is performed, $c_n(t)$ is a code series indicating a pilot signal relating to a n-th transmission antenna.

Figure 5:
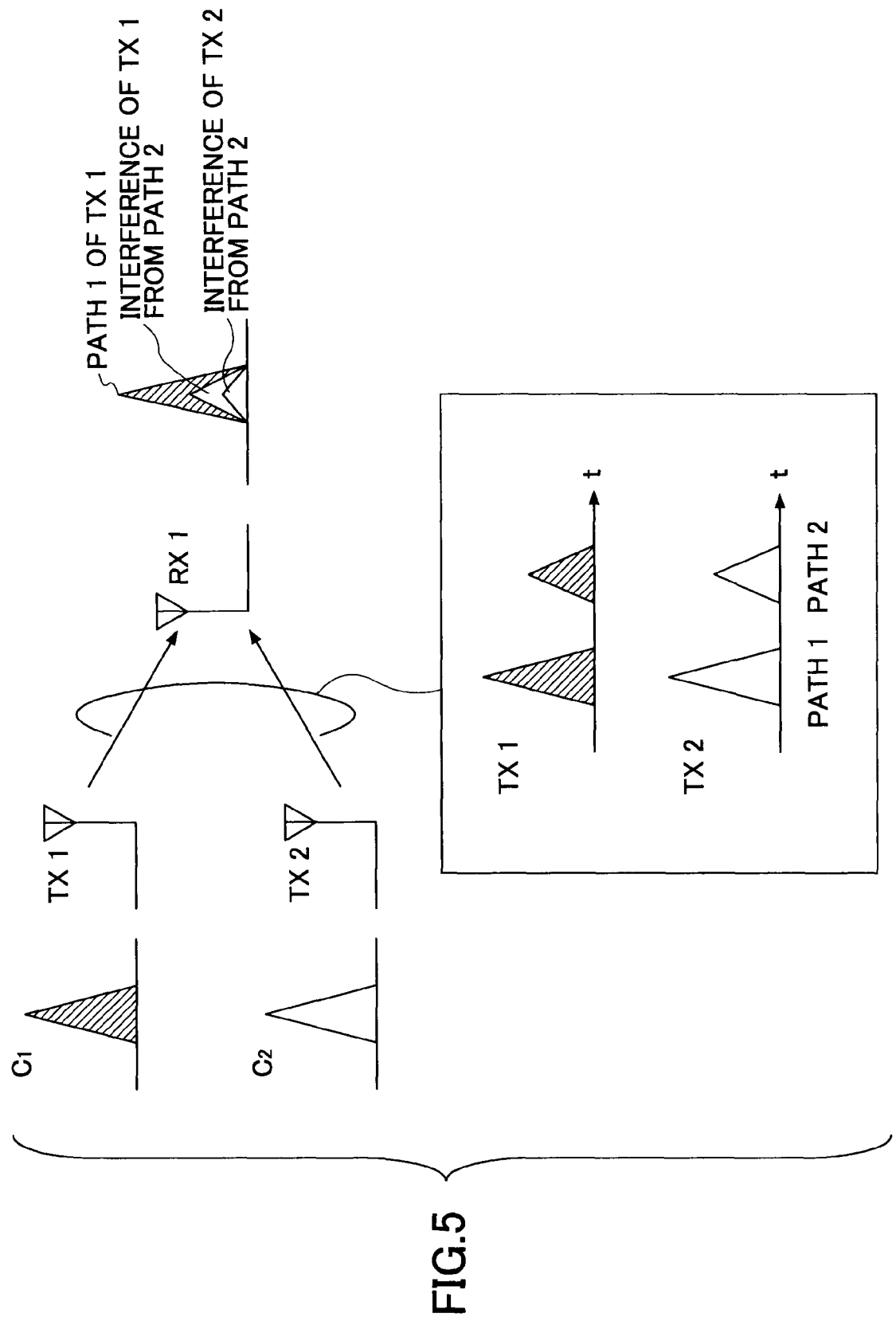
FIG. 5 is a conceptual diagram for explaining relationships among transmission signals, received signals and the multipath interference component.

The multipath interference generation part 406 calculates multipath interference components included in pilot signals for each path. FIG. 5 is a conceptual diagram for explaining relationships among transmission signal, received signal and the multipath interference component. For the sake of simplicity, it is assumed that two transmission antennas Tx1 and Tx2 transmit pilot signals $c_1$ and $c_2$ respectively, and the signals are transmitted under a multipath propagation environment and received by a receiving antenna Rx1. In addition, it is assumed that there are two paths of a path 1 and a path 2. Although the number of antennas and the number of paths are assumed as mentioned above, greater numbers can be assumed. In this case, a power obtained based on a correlation between signals received by the receiving antenna Rx1 and the pilot signal $c_1$ includes a multipath interference component of Tx1 from the path 2 and a multipath interference component of Tx2 from the path 2 in addition to a power of Tx1 from the path 1. When there are more paths, multipath interference components appear according to the number of paths. When the number of transmission antennas increase, multipath interference components appear according to the increased number of transmission antennas.

Figure 6:
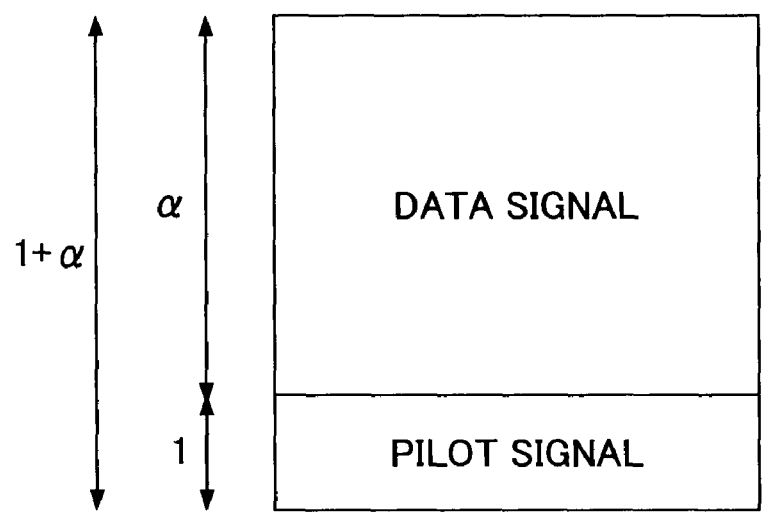
FIG. 6 is a diagram showing power ratio between the pilot signal and the data signal.

Not only the pilot signal but also a data signal transmitted with the pilot signal contribute to the multipath interference. When a signal is transmitted from a transmission antenna, a power ratio between the pilot signal and the data signal is predetermined. For example, as shown in FIG. 6, a power ratio of the data signal to the pilot signal is $\alpha$. Therefore, when the power for the pilot signal is determined, the power of the data signal can be determined. According to the above-mentioned considerations, the multipath interference component generation part 406 in FIG. 4 obtains the multipath interference components for each path.

The multipath interference removing part 408 calculates a corrected received power $P'_{n,m,l}$ of the pilot signal for each path by subtracting multipath interference component from the received power of the pilot signal for each path obtained in the pilot received power estimation part 404 based on the following equation:

$$p'_{n,m,l} = p_{n,m,l} - \frac{\sum_{n'}^{N} \sum_{l', l' \neq l}^{L} (1+\alpha) P_{n',m,l'}}{N_c}$$

wherein $(1+\alpha)P_{n',m,l'}$ indicates a total power (of the pilot signal and the data signal) of a l'-th path in signals from a n'-th transmission antenna. As shown in this equation, summation relating to l' is performed for all paths excluding the own (l-th) path, summation relating to n' is performed for all transmission antennas, and, Nc indicates the number of chips in one frame and 1/Nc is introduced in a term indicating the multipath interference component for obtaining multipath interference per chip.

Figure 7:
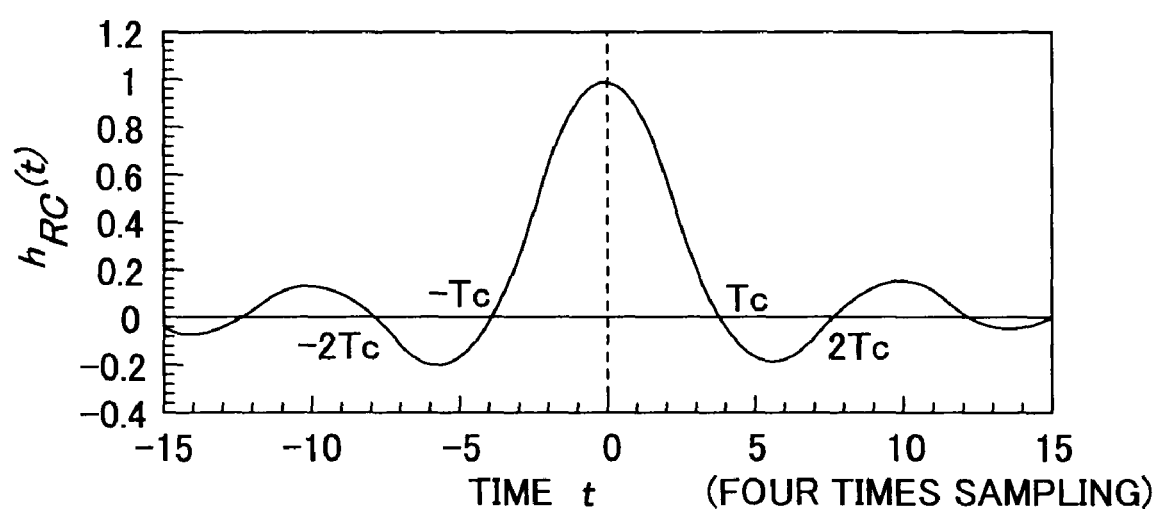
FIG. 7 is a diagram showing characteristics of impulse response of the roll-off filter.

The total received signal power estimation part 410 estimates the total received power of the pilot signals received by a m-th receiving antenna by further correcting the corrected received power of the pilot signal for each path. The total received power of the pilot signals received by a m-th receiving antenna can be mostly calculated by adding, for all paths and for all transmission antennas, the corrected received power $P'_{n,m,l}$ of the pilot signal for each path. However, from the viewpoint of improving the precision, it is desirable to further perform correction. Generally, the signal received by each receiving antenna includes a side lobe component in addition to a main lobe since the signal passes through a roll-off filter (band limitation filter). Thus, the received power of the pilot signal includes the side lobe component, so that the amount of the received signal power is evaluated to be larger than an actual amount to some extent. Since the impulse response characteristics of the roll-off filter are known, the side lobe component can be compensated based on the known response characteristics. The impulse response characteristics $h_{RC}(t)$ of the roll-off filter are shown as FIG. 7, for example, and is represented as the following equation:

$$h_{RC}(t) = \left( \frac{\sin(\pi t/Tc)}{\pi t/Tc} \right) \left( \frac{\cos(\pi \alpha t/Tc)}{1 - (4\alpha t/(2Tc))^2} \right)$$

wherein $\alpha$ is a roll-off factor and $\alpha=0.22$ in the example of FIG. 7, Tc indicates a chip period. Generally, the range ($|t| \leq Tc$) of the one chip period can be associated with the main lobe (actual signal component of the path), and a range ($|t| > Tc$) other than the one chip period can be associated with the side lobe.

The total received signal power estimation part 410 further corrects the corrected received power $P'_{n,m,l}$ of the pilot signal for each path according to the following equation, so as to estimate a total received power $P_{all,m}$ of the pilot signals received by the m-th receiving antenna:

$$p_{all,m} = \frac{1}{N_{os}} \sum_{t=0}^{N_{os}-1} \sum_{n=1}^{N} \sum_{c=-W/2}^{W/2} \left( \sum_{l=1}^{L} \sqrt{(1+\alpha) P'_{n,m,l}} \cdot e^{j\theta(n,m,l)} \cdot h_{Rc}(t + \tau_l - \tau_1 + cN_{os}) \right)^2$$

wherein $N_{os}$ indicates the number of oversampling and $N_{os}=4$ in the present example, $\theta(n,m,l)$ indicates a phase rotation amount of a l-th path between n-th transmission antenna and a m-th receiving antenna (which does not contribute to power). Correction on the side lobe component mainly relates to summation for the parameters t and c. By performing summation for all paths (parameter l) and all antennas (parameter n), the total received power $P_{all,m}$ of the pilot signals received by the m-th receiving antenna can be estimated.

The subtraction part 412 calculates a noise power (chip noise power) $\sigma_m^2$ of signals received by the m-th receiving antenna by subtracting the estimated total received power $P_{all,m}$ from the total received power $R_m$ of the pilot signals received by the m-th antenna as shown in the following equation:

$\sigma m2 = Rm - Pall,m$ wherein this process is performed for each receiving antenna.

The averaging part 414 averages the noise powers σm2 (m=1~N), that are obtained for each received antenna, for all receiving antennas so as to obtain a noise power σ2 of the receiver. Since the effect of the multipath interference is removed in the obtained noise power, the noise power is estimated more correctly compared with the conventional technology. Therefore, the weight generation part 310 of FIG. 3 can calculate the weight properly. In addition, from the viewpoint of further improving the precision, the averaging part 414 may update the noise power recursively by using an oblivion coefficient a. That is, the noise power can be updated according to σk+12=a·k2+(1−a)σk−12. The updating method of the noise power is not limited to the above mentioned method using the oblivion coefficient. The update can be performed by using other recurrence formulas. Further, weighting coefficient can be appropriately adjusted when averaging the noise powers in the receiving antennas.

Second Embodiment

In the first embodiment, the noise power σ2 is estimated based on received signals on which despreading has not been performed. On the other hand, in the second embodiment described in the following, the noise power σ2 is estimated based on despread received signals.

Figure 8:
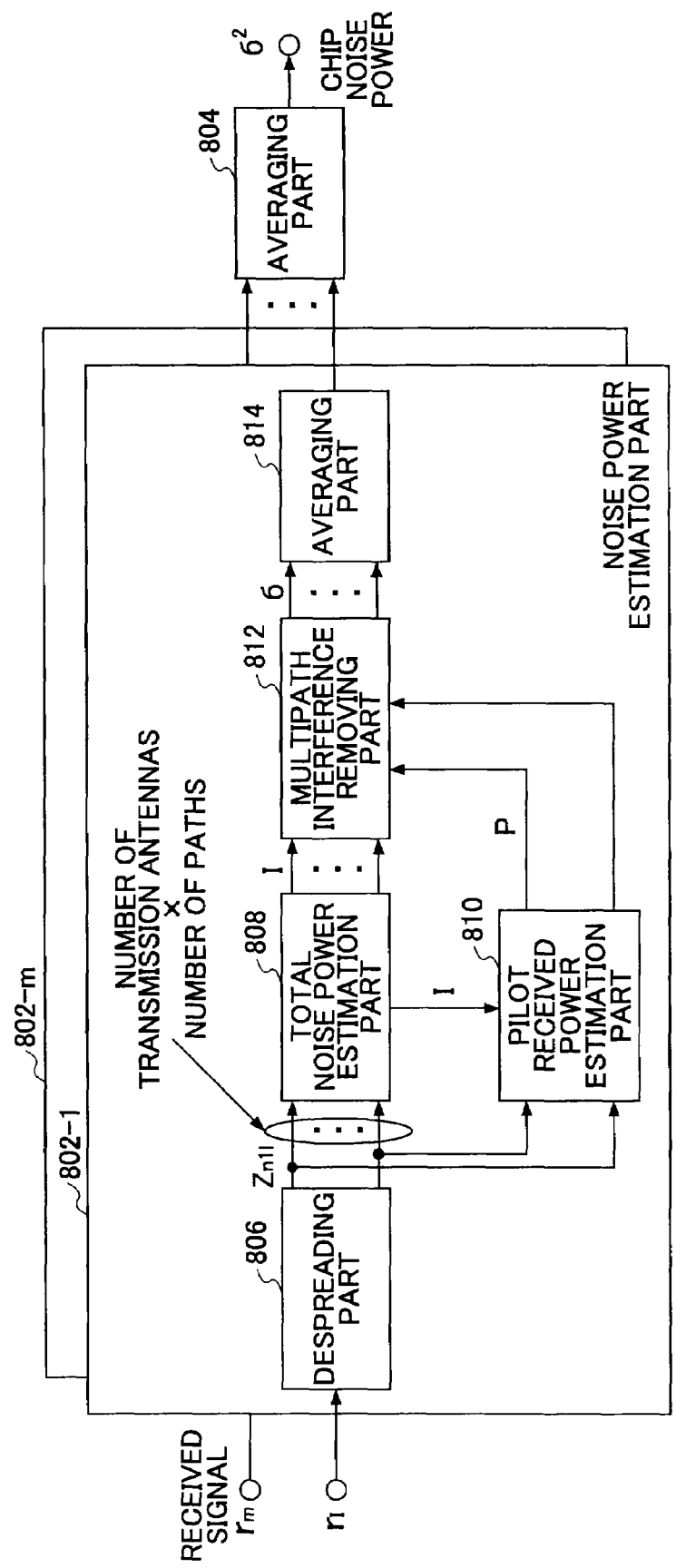
FIG. 8 is a block diagram of the noise estimation part according to an embodiment of the present invention.

FIG. 8 is a block diagram of the noise estimation part according to the present embodiment. The noise estimation part includes M noise power estimation parts 802-1~M each being provided for a corresponding receiving antenna, and an averaging part 804 among antennas. For the sake of simplicity, FIG. 8 shows only two noise power estimation parts 802-1 and 802-m. Since each of the noise power estimation parts has the same configuration and operates in the same way, the noise power estimation part 802-1 is described as an example.

The noise power estimation part 802-1 includes a despreading part 806, a total noise power estimation part 808, a pilot received power estimation part 810, a multipath interference removing part 812 and an averaging part 814.

The despreading part 806 despreads signals received by a corresponding receiving antenna so as to output pilot signals $Z_{n,m,l}(s)$ that are despread for each transmission antenna and for each path, wherein n is a parameter indicating a transmission antenna, m is a parameter indicating a receiving antenna (m=1 for the noise power estimation part 802-1), l is a parameter indicating a path, and s is a parameter indicating a symbol number.

The total noise power estimation part 808 calculates total noise powers $I_{n,m,l}$ each being proportional to dispersion of the despread pilot signal for each path according to the following equation:

$$I_{n,m,l} = \frac{S}{S-1}\left(\frac{1}{S}\sum_{s=0}^{S-1}|Z_{n,m,l}(S) - Z'_{n,m,l}|^2\right)$$

wherein $Z'_{n,m,l}$ is an amount calculated by the following equation:

$$Z'_{n,m,l} = \frac{1}{S}\sum_{s=0}^{S-1} Z_{n,m,l}(S),$$

wherein this equation means calculating an average value of the despread pilot signals $Z_{n,m,l}(s)$ for S symbols. In the right side of the equation for calculating the total noise power $I_{n,m,l}$, the term inside the parentheses indicates an amount of dispersion of the despread pilot signal $Z_{n,m,l}$. Therefore, the total noise power $I_{n,m,l}$ indicates power including noise arising in the receiver, interference included in the propagation route and other noise.

The pilot received power estimation part 810 calculates received powers $P_{n,m,l}$ of the pilot signals for each path by the following equation:

$$p_{n,m,l} = |Z'_{n,m,l}|^2 - \frac{1}{S}I_{n,m,l}$$

wherein the second term in the right side of the equation indicates interference component included in the received power $|Z'_{n,m,l}|^2$ of the averaged pilot signal. Interference component of received power $|Z_{n,m,l}|^2$ of the before-averaged pilot signal is evaluated by the above total noise power $I_{n,m,l}$. The interference component included in the received power $|Z'_{n,m,l}|^2$ that has been averaged for the S symbols is decreased to 1/S of the interference component of the before-averaged received power $|Z_{n,m,l}|^2$ due to the averaging calculation. Therefore, 1/S is introduced in the second term of the right side of the equation. By using the above equation, the received power $P_{n,m,l}$ of the pilot signal for each path can be calculated correctly.

The multipath interference removing part 812 removes multipath interference component from the total noise power $I_{n,m,l}$ so as to estimate the noise power (chip noise power) $\sigma_{n,m,l}^2$ according to the following equation:

$$\sigma_{n,m,l}^2 = N_{SF}\left(I_{n,m,l} - \frac{1}{N_{SF}}\sum_{n'=1}^{N}\sum_{\substack{l'=1 \\ l' \neq l}}^{L}(1+\alpha)P_{n',m,l'}\right)$$

wherein α indicates a predetermined power ratio between the pilot signal and the data signal (refer to FIG. 6), $(1+\alpha)P_{n',m,l'}$ inside the parentheses in the right side indicates a total power (of the pilot signal and the data signal) of a l'-th path in signals from a n'-th transmission antenna, summation for l' is performed for all paths excluding the own l-th path, summation for n is performed for all transmission antennas, $N_{SF}$ indicates a spreading ratio or a chip rate of the pilot signal, and $N_{SF}$ is 256, for example. In the DS-CDMA scheme, since the interference component in a propagated signal is reduced to 1/(spreading ratio), $1/N_{SF}$ is introduced in the second term (indicating multipath interference) inside the parentheses in the right side. In addition, the right side is multiplied by $N_{SF}$ to estimate the chip noise power.

The averaging part 814 averages the noise powers σnml2 for plural transmission antennas (n) and the paths (l). Further, the averaging part 804 averages the noise powers for the plural receiving antennas (m) to finally estimate a desired noise power σ2. Since the effect of the multipath interference is removed in the obtained noise power, the noise power is estimated more correctly compared with the conventional technology. Therefore, the weight generation part 310 of FIG. 3 can calculate the weight properly. In addition, from the viewpoint of further improving the precision, the averaging part 814 or 804 may update the noise power recursively by using an oblivion coefficient a. That is, the noise power can be updated according to σk+12=a·σk2+(1−a)σk−12. The updating method of the noise power is not limited to the above mentioned method using the oblivion coefficient. The update can be performed by using other recurrence formulas. Further, weighting coefficient can be appropriately adjusted when averaging the noise powers among antennas.

Third Embodiment

Figure 9:
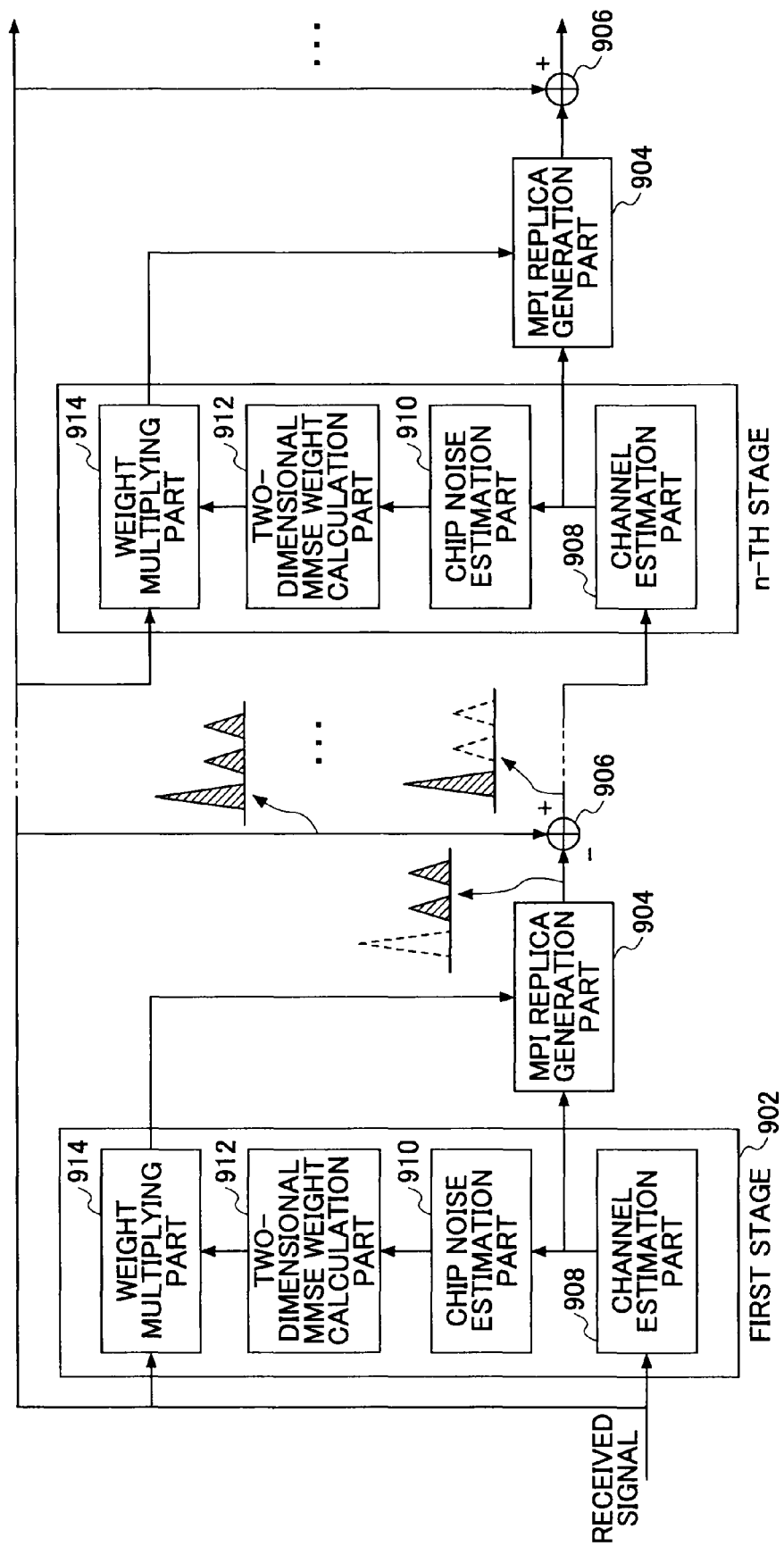
FIG. 9 shows a conceptual diagram of a multistage signal detection apparatus according to an embodiment of the present invention.

FIG. 9 shows a conceptual diagram of a multistage signal detection apparatus according to an embodiment of the present invention. The signal detection apparatus includes serially connected plural blocks each including a two-dimensional MMSE equalizing part 902, a multipath interference (MPI) replica generation part 904, and a subtracting part 906. The two-dimensional MMSE equalizing part 902 includes a channel estimation part 908, a chip noise estimation part 910, a two-dimensional MMSE weight calculation part 912 and a weight multiplication part 914. These components in the two-dimensional MMSE equalizing part 902 correspond to the channel estimation part 302, the noise estimation part 304, the weight generation part 310 and MMSE equalizing part 312 respectively. Either of noise estimation methods in the first embodiment and the second embodiment can be adopted as a noise estimation method used in the chip noise estimation part 910.

The MPI replica generation part 904 regenerates multipath components based on the channel estimation result and the transmission signals that have been separated. For example, signal components (corresponding to path 2 in the example of FIG. 5) of all paths other than a target path are regenerated. The regenerated signal components are called MPI replicas. The subtraction part 906 subtracts the MPI replicas from the received signals. In the signals in which the MPI replicas have been subtracted, the ratio of the target path is increased. Therefore, by performing channel estimation and signal separation based on the signal in which the MPI replicas have been subtracted, estimation accuracy and separation accuracy can be improved. In the same way, based on the after-subtracted signal in the previous stage, channel estimation and signal separation are performed so as to generate MPI replicas, and the MPI replicas are subtracted from the received signals, and the signals are supplied to the channel estimation part of a next stage. Accordingly, the channel estimation accuracy and the signal separation accuracy can be largely improved.

The present invention is not limited to the specifically disclosed embodiments, and variations and modifications may be made without departing from the scope of the invention.

The present application contains subject matter related to Japanese Patent Application No.2004-144181, filed in the JPO on May 13, 2004, the entire contents of which are incorporated herein by reference.

What is claimed is:

1. A noise power estimation apparatus for MIMO scheme, comprising:
   a unit configured to obtain total noise powers, wherein each of the total noise powers is proportional to dispersion of a despread pilot signal for each of paths from which the pilot signal is received;
   a unit configured to subtract an amount that is obtained by dividing the total noise power of each path by a predetermined number of symbols from an average power of the despread pilot signal averaged for the predetermined number of symbols so as to obtain a received power of the pilot signal for each of the paths; and
   a unit configured to obtain a multipath interference component based on the received power of the pilot signal for each of the paths and a predetermined power ratio between the pilot signal and a data signal transmitted with the pilot signal, and to subtract the multipath interference component from the total noise power of each path so as to obtain a noise power for each of the paths.

2. A signal detection apparatus adopting the MMSE scheme, in which received signals that are transmitted by plural transmission antennas and that are received by one or more receiving antennas are multiplied by receiving weights so as to separate the received signals to signals for each transmission antenna,
   wherein the signal detection apparatus includes a noise estimation apparatus, and the signal detection apparatus calculates the receiving weights by using a noise power estimated by the noise power estimation apparatus, the noise power estimation apparatus comprising:
   a unit configured to obtain total noise powers, wherein each of the total noise powers is proportional to dispersion of a despread pilot signal for each of paths from which the pilot signal is received;
   a unit configured to subtract an amount that is obtained by dividing the total noise power of each path by a predetermined number of symbols from an average power of the despread pilot signal averaged for the predetermined number of symbols so as to obtain a received power of the pilot signal for each of the paths; and
   a unit configured to obtain a multipath interference component based on the received power of the pilot signal for each of the paths and a predetermined power ratio between the pilot signal and a data signal transmitted with the pilot signal, and to subtract the multipath interference component from the total noise power of each path so as to obtain a noise power for each of the paths.

3. A noise power estimation method, comprising the steps of:
   obtaining total noise powers, wherein each of the total noise powers is proportional to dispersion of a despread pilot signal for each of paths from which the pilot signal is received;
   subtracting an amount that is obtained by dividing the total noise power of each path by a predetermined number of symbols from an average power of the despread pilot signal averaged for the predetermined number of symbols so as to obtain a received power of the pilot signal for each of the paths;
   obtaining a multipath interference component based on the received power of the pilot signal for each of the paths and a predetermined power ratio between the pilot signal and a data signal transmitted with the pilot signal; and
   subtracting the multipath interference component from the total noise power of each path so as to obtain a noise power for each of the paths.

* * * * *